United States Patent [19]

Benson

[11] Patent Number: 5,001,600
[45] Date of Patent: Mar. 19, 1991

[54] DEAD FRONT FUSE DOOR

[76] Inventor: Gregory C. Benson, 428 Old Farm Dr., Birmingham, Ala. 35215

[21] Appl. No.: 514,761

[22] Filed: Apr. 29, 1990

[51] Int. Cl.$^5$ .......................... H02B 1/04; H02B 1/06; H02B 1/14
[52] U.S. Cl. .................................. 361/340; 361/345; 200/50 A
[58] Field of Search ...................... 439/131; 200/50 A; 361/335, 340, 344, 349, 357, 432

[56] References Cited
U.S. PATENT DOCUMENTS 4,250,357 2/1981 Hanke ............................. 361/349 X
4,463,227 7/1984 Dizon et al. ...................... 200/50 A
4,827,374 5/1989 Dunn ................................... 361/345

Primary Examiner—Leo P. Picard
Assistant Examiner—Michael W. Phillips
Attorney, Agent, or Firm—Jennings, Carter, Thompson & Veal

[57] ABSTRACT

A dead front fuse mounting assembly for use in high voltage enclosures, utilizes a shock absorber assisted door design to reduce impact forces which occur when such assemblies are improperly opened. Secondly the interior of the fuse compartment is closed to entry by foreign objects by an insulating door which moves concomitantly with the fuse mounting assembly and is locked in a closed position when the assembly is in its open position.

16 Claims, 3 Drawing Sheets

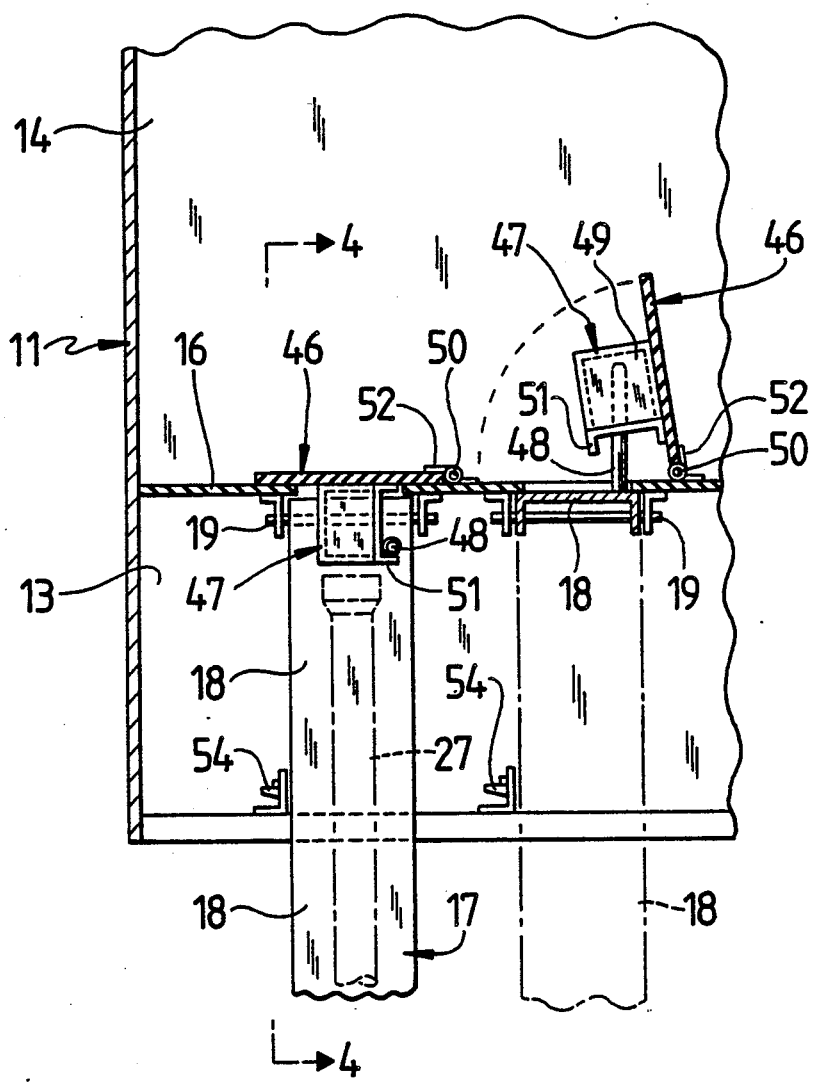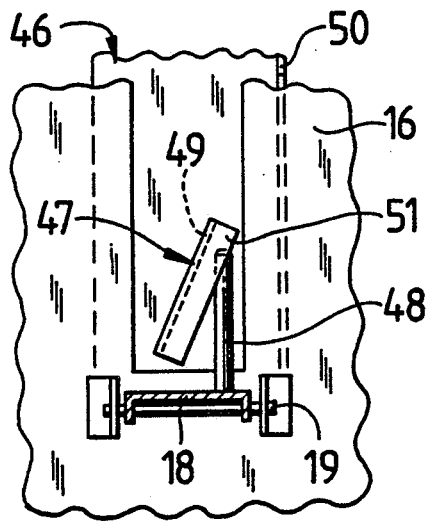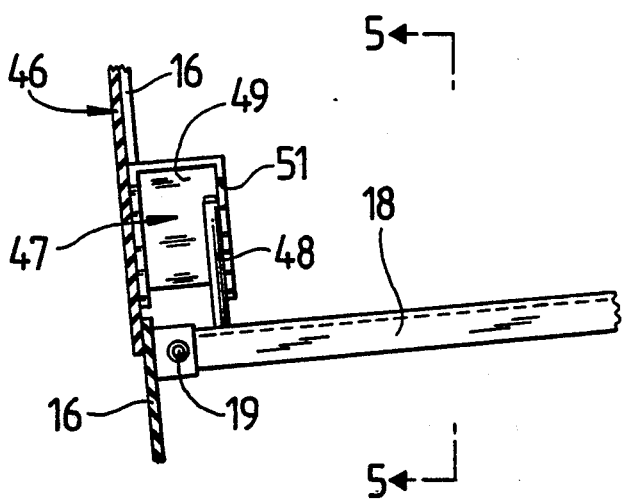

DEAD FRONT FUSE DOOR

FIELD OF THE INVENTION

The present invention relates to electrical equipment such as 25 Kv fuse and switch enclosures. More particularly the present invention relates to fuse mountings in such enclosures and specifically to what is known as a dead front fuse door for mounting a phase fuse such that it may be removed from electrical contact by pivoting an associated mounting door. In even greater particularity, the present invention relates to a fuse door configured to avoid high impact upon opening the circuit and to seal an associated fuse compartment against airborne contamination when closed.

BACKGROUND OF THE INVENTION

It is current practice to mount power fuses used in conjunction with power distribution circuits within a metal enclosure having hinged access doors. In such structures, fuses and other live electrical components may be mounted behind a dead front wall which isolates the human operator from these components when they are energized. Such devices in the prior art are represented by the disclosure in U.S. Pat. No. 4,250,357 wherein a fuse isolating wall is provided inside a metal housing structure and is located immediately behind the housing doors. Fuse panels are hingedly mounted to the isolating wall and constitute parts thereof so that a fuse mounted or fuse mounting insulating structure secured to the interior of each fuse panel is isolated from access by an operator so long as the panel is in its normal position forming a part of the insulating wall. Conducting means preferably in the form of a bushing having a conventional bushing well extends through the fuse panel and is interconnected with one terminal of the fuse on the inside of the fuse panel while a part of the conducting structure extends outside the fuse panel and is arranged for disjointable engagement with connecting means such as a circuit elbow connector. The fuse panel is held in its normal position as a part of an isolating wall by latch means and such latch means is held in its latching position by an interlock movably mounted on the fuse panel. Portions of the interlock operating lever are interposed between the fuse panel and the disjointable connector. When it is desired to replace a fuse, the disjointable connecting means is removed from its associated conductor and the interlock operating lever is moved to its latch releasing position following which an operating rod is used to engage the latch and to rotate it to its unlatched condition. The fuse panel is then swung out of its position as a part of the isolating wall and may then be removed therefrom to a convenient location for the replacement of the fuse. Thereafter the procedure is reversed to reinsert the replacement fuse into the circuit.

One problem inherent with this type system is that the human operator may be required to use a 10 to 14 foot long "hook stick" to open or close the mounting assembly. A force of above 50 lbs. may be required to lift the assembly to begin movement thereof to a closed position, thus requiring considerable strength from an operator using a "hook stick". Conversely, when opening the assembly, if the "hook stick" slips for any reason the door and fuse can slam down to the open position causing severe damage or destruction to the mounting plate and high voltage fuse. This is particularly hazardous when glass tube current limiting fuses are used.

Another problem is isolation of the components within the fuse compartment when the fuse mounting door is open. Prior U.S. Pat. Nos. 4,827,374 and 4,463,227 have each dealt with the problem, however neither has provided a totally satisfactory solution. Consequently there remains a need for an assembly that controls the descent of a fuse mounting plate as it is opened and a mechanism for simultaneously isolating the fuse mounting assembly from the fuse compartment.

SUMMARY OF THE INVENTION

It is the principal object of the present invention to provide a mounting door for a dead front fuse panel which will reduce the likelihood of damage to the equipment or injury to personnel resulting from free fall of the panel.

Yet another object of the invention is to provide a means for sealing the fuse mounting opening to prevent airborne contamination in the fuse chamber.

Still another object of the invention is to make it easier for the human operator to properly close the fuse mounting plate when maintenance thereof is complete.

These and other objects and features of my invention are advantageously accomplished by my novel design which utilizes a damping mechanism to arrest the downward motion of the fuse mounting plate and urge the plate toward the closed position over at least a part of the range of motion of the plate. Secondly I use a camming door latch mechanism to urge the fuse mounting panel against the transverse wall to seal against airborne contamination. I also use a secondary door which isolates the fuse from the fuse compartment when the panel is in the open position and phase isolation in the panel closed position.

BRIEF DESCRIPTION OF THE DRAWINGS

Apparatus embodying features of my invention are depicted in the accompanying drawings which form a portion of this disclosure and wherein:

FIG. 3 is a partial sectional view taken along line 3—3 of FIG. 1 showing the fuse mounting panels;

FIG. 4 is a sectional view taken along line 4—4 of FIG. 3; and

FIG. 5 is a sectional view taken along line 5—5 of FIG. 4.

DESCRIPTION OF A PREFERRED EMBODIMENT

Figure 1:
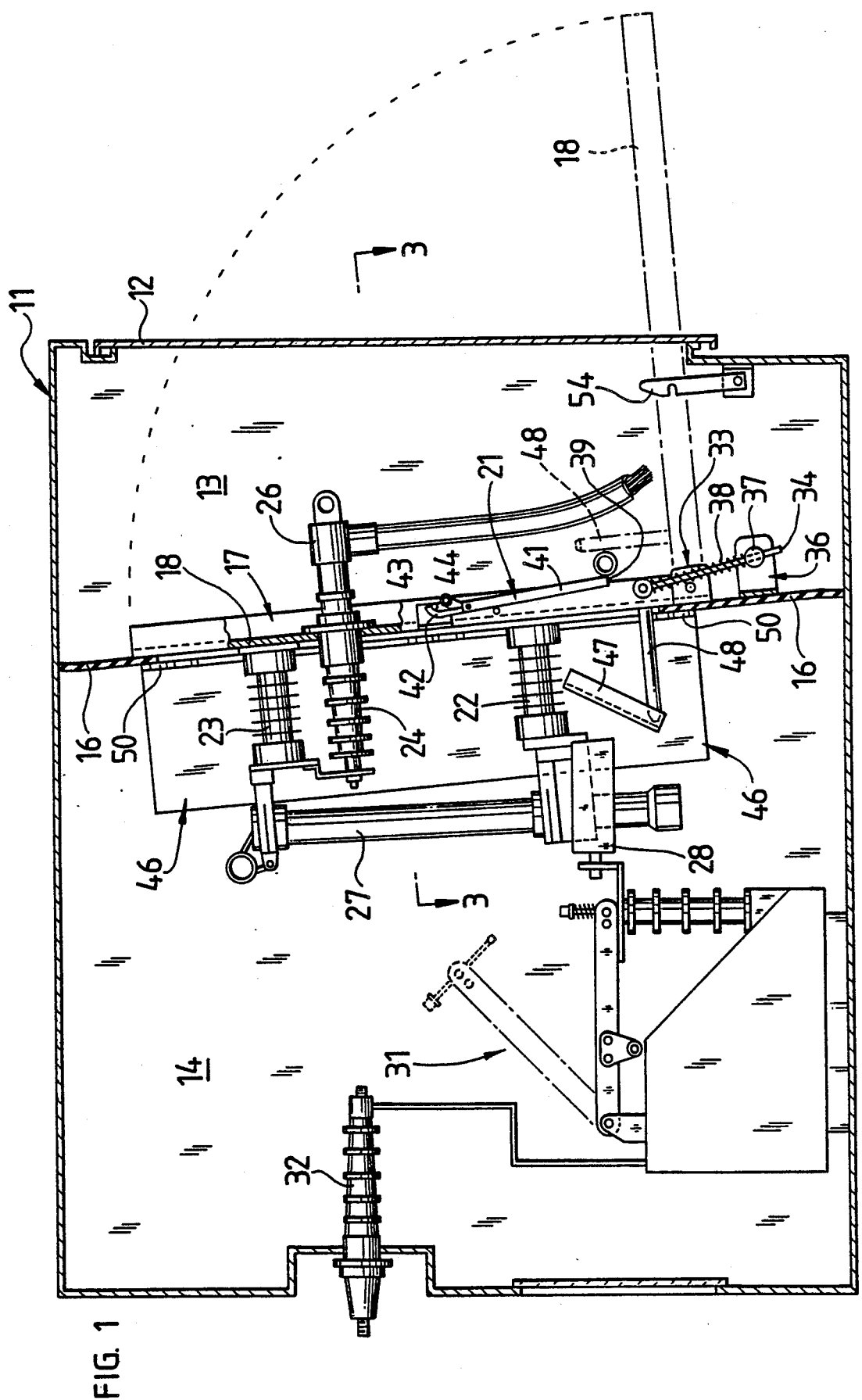
FIG. 1 is a side sectional view taken along a vertical plane through the enclosure.

Referring to the Figures for a clearer understanding of my invention it may be seen in FIG. 1 that my invention is to be used in connection with a metal electrical enclosure 11 or cabinet having a set of hinge mounted doors 12 which allow access to the interior thereof. The interior is divided into a front compartment 13 and a fuse compartment 14 by a transverse wall 16. Wall 16 is inclined rearwardly from the front of the enclosure 11 and provides electrical isolation between the front and rear compartments 13 and 14. Access to the fuse compartment 14 is gained by opening one of the fuse mounting assemblies 17 shown in FIGS. 1 and 2.

Each fuse mounting assembly 17 includes a fuse mounting plate 18, pivotally mounted to wall 16 by a rigidly mounted hinge 19 which rotates on precision bearings, a latch assembly 21, and fuse mounting members 22 and 23. Each plate 18 has an electrical fitting 24 for receiving an elbow connector 26, with the fitting 24 and connector 26 forming part of an electrical circuit to one end of a fuse 27 secured in mounting members 22 and 23. Lower fuse mounting member 22 includes a contact arm 28 which engages a contact 29 in a switch assembly 31, also located in compartment 14. The switch assembly operates in a manner well known in the art to open the circuit between the fuse 27 and an electrical fitting 32 which connects to the remainder of the associated high voltage circuitry.

Figure 2:
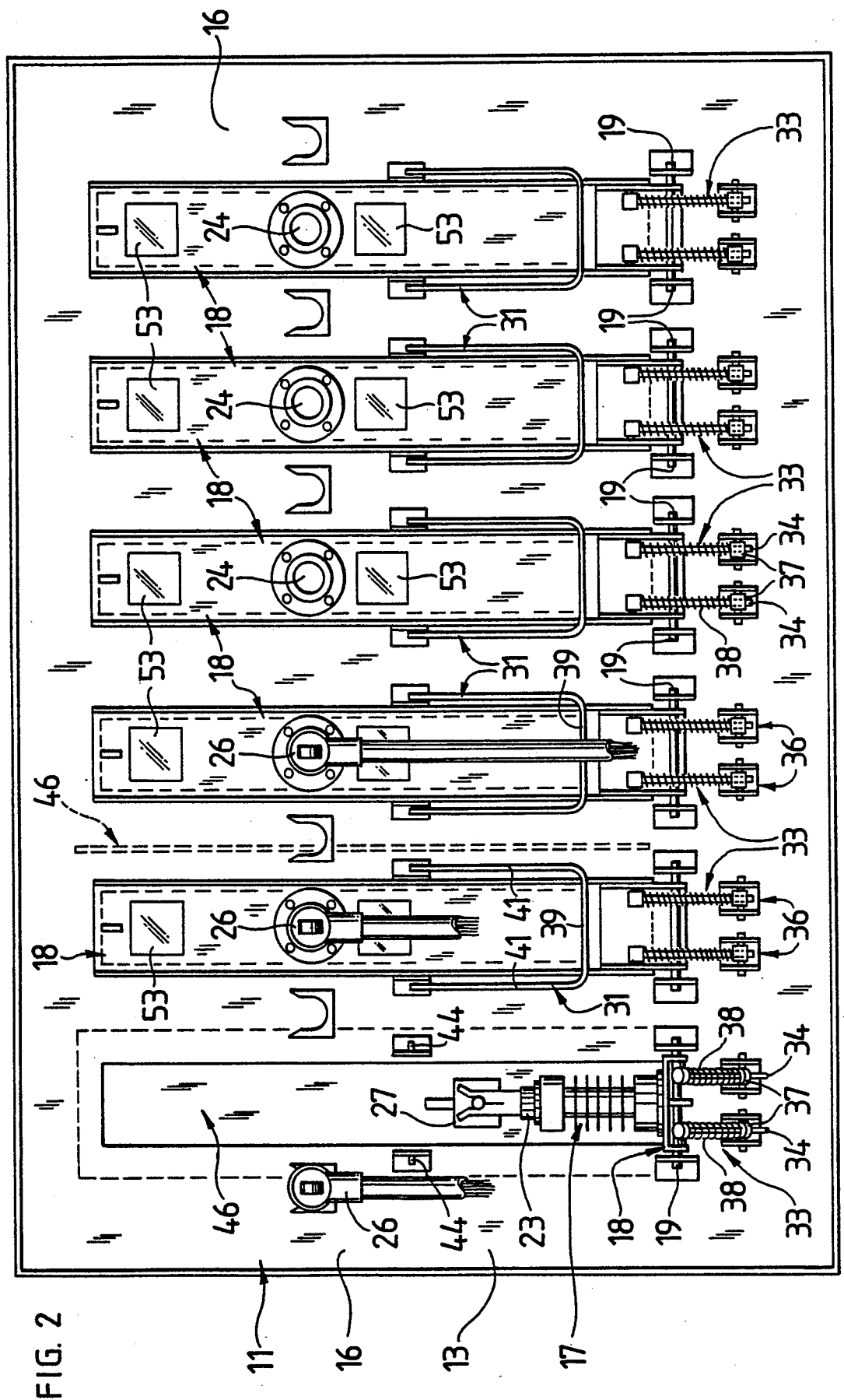
FIG. 2 is a front elevational view of the transverse wall and face mounting plates.

With reference to FIGS. 1 and 2, it may be seen that each fuse mounting panel 18 has a pair of shock absorber elements 33 mounted to the lower portion thereof. Each shock absorber element 33 includes a guide rod 34 pivotally mounted at its upper end to the panel 18 and extending downwardly below the hinge 19 to a resilient mount 36. Each resilient mount 36 is essentially a pivotally mounted guide sleeve 37 and a spring 38 mounted concentrically about the guide rod 34 such that downward movement of the guide rod 34 causes compression of the spring 38.

The latch assembly 21 includes a generally U-shaped handle 39 having a mounting leg 41 formed at each end thereof to extend outwardly from the plane of the handle 39 to pivotally engage associated mounting pins carried on each side of the panel 18. Each end of the handle 39 terminates in a curved camming member 42 having a cam surface 43 which engages a latch pin 44 mounted on the wall 16. The cam surfaces 43 are formed such that when the handle is lowered with the cam members between the wall 16 and the latch pins 44, the panel 18 is urged tightly against the wall at the periphery of the panel to prevent entry of dust or other airborne contaminants within compartment 14. It will be appreciated that with the handle 3 in the full down position the panel is locked to the wall and by virtue of the placement of fitting 24 and elbow 26 the handle cannot be raised to unlock or open the panel without first removing elbow 26 from the fitting 24. Accordingly the panel 18 cannot be pivoted on hinge 19 without first creating an open circuit condition.

Referring to FIGS. 1 and 3 it may be seen that a secondary insulating door 46 is pivotally mounted to the transverse wall 16 on a set of hinges 50 such that the door 46 moves orthogonally to the motion of the panel 18. The door 46 carries thereon a guide bracket 47 which slidably engages a guide rod 48 mounted on the panel 18 such that when the panel is in the closed position the door 46 is held open, spaced from the fuse mounting and thus acting as a partial partition intermediate fuses on adjacent phases. The guide bracket is a channel-like member mounted at an acute angle to the rod 48 when the panel 18 is closed. Thus the bracket 47 forms an internal slide surface 49 against which the rod 48 moves to open the door 46 and a latching flange 51 which, as may be seen in FIGS. 4 and 5, abuts against rod 48 to prevent inadvertent opening of the door when the panel is in the open position. It will be noted that a set of springs 52 urge the door toward a closed position. Thus the door is maintained in contact with the rod 48 through brackets 47 at all times.

From the above, the operation of my apparatus is readily understood. In normal use panel 18 is closed and urged tightly against wall 16 by the camming action of the latch mechanism 21. A high voltage circuit is completed through the associated switch assembly 31 and fuse 27 for each phase within the enclosure 11. With the panel 18 in the closed position the insulating door 46 is held in a partition position by the associated rod 48 extending from the door and engaging the bracket 47. To service them the operator would first disengage the elbow connector 26 and switch assembly 31. He may then view the interior of the compartment 14 through a pair of windows 53 in the plate 18. If it becomes necessary to access the fuse, handle 39 is raised to move the cam member 42 out of engagement with the locking pin 44. Note that the foregoing is accomplished using a hot stick, so the operator is at a distance of 8–12 feet from the plate as he opens it. As the mounting plate 18 pivots downwardly to the open position the springs of the shock absorber assembly 33 are compressed, thereby slowing the descent and lessening the impact of the fuse mounting assembly 17 against the enclosure 11 if the assembly 17 is allowed to free fall. When the assembly 17 abuts the enclosure 11 a spring loaded latch 54 engages a pin carried on the side of the mounting plate to secure the assembly in a down and locked position. Concomitant with the downward movement of the mounting plate 17, the spring loaded door 46 is urged by spring 52 to its closed position. As the mounting plate reaches its lowermost position the door completes its pivot of approximately 90 degrees such that rod 48 is positioned between flange 51 and the door, hence the door is held in its closed position. Upon inspection or replacement of the fuse 27 the latch 54 is released and the shock absorber springs assist in urging the mounting assembly toward its closed position. The precision bearings of hinge 19 assure that the contact arm 28 is received properly in the contact for the switch assembly.

Thus it may be seen that my device significantly reduces the possibility of injury to the equipment or the operator at all times by reducing the potential impact forces which can be generated in a free fall condition; latching the access door to prevent inadvertent entry of the operator or tools into the fuse compartment; and reducing the force and effect required to lift the mounting assembly in returning it to a closed position.

While I have shown my invention in one form, it will be obvious to those skilled in the art that it is not so limited but is susceptible of various changes and modifications without departing from the spirit thereof.

What I claim is:

1. In a high voltage switchgear enclosure containing a fuse and a first electrical contact the combination therewith of a dead front fuse mounting assembly comprising: a mounting plate pivotally affixed to a transverse interior wall of said switchgear enclosure so as to move selectively to an open position and a closed position relative to an opening formed in said transverse wall, said mounting plate supporting said fuse in fixed parallel relation thereto so as to move relative to said first electrical contact between an electrically open and an electrically closed position; a non-conductive door movable between a fuse isolating position and a phase isolating position responsive to the movement of said mounting plate between said open position and said closed position; latch means for releasably locking said plate in said closed position; and damping means affixed between said plate and said enclosure for reducing the impact force generated by said plate in moving between said closed and open positions.

2. A dead front fuse mounting assembly as defined in claim 1 further comprising means resiliently urging said non-conductive door toward said fuse isolating position.

3. A dead front fuse mounting assembly as defined in claim 2 further comprising means, for engaging said non-conductive door responsive to movement of said mounting plate to said closed position and urging said door to said phase isolating position concomitant with movement of said fuse to said electrically closed position.

4. A dead front fuse mounting assembly as defined in claim 1 further comprising means for engaging said non-conductive door responsive to movement of said mounting plate to said closed position and urging said door to said phase isolating position concomitant with movement of said fuse to said electrically closed position.

5. A dead front fuse mounting assembly as defined in claim 1 wherein said damping means comprises at least one shock absorber assembly affixed between said mounting plate and fixed portion of said enclosure.

6. A dead front fuse mounting assembly as defined in claim 5 wherein said shock absorber assembly includes a resilient means urging said plate toward said closed position.

7. A dead front fuse mounting assembly as defined in claim 6 further comprising means for releasably securing said plate in said open position.

8. A dead front fuse mounting assembly as defined in claim 5 further comprising means for engaging said non-conductive door responsive to movement of said mounting plate to said closed position and urging said door to said phase isolating position concomitant with movement of said fuse to said electrically closed position.

9. A dead front fuse mounting assembly as defined in claim 1 wherein said latching means comprises a generally U-shaped handle member having a width commensurate with the width of said mounting plate and pivotally mounted thereto proximal each end of said handle member, with each end of said handle member forming a curved cam surface orthogonal to said handle member, and a first and second cam pin affixed to said transverse wall proximal said opening and spaced from said wall so as to receive the ends of said handle member between said cam pins and said wall with said cam surfaces engaging said cam pins.

10. A dead front fuse mounting assembly as defined in claim 9 wherein said damping means comprises at least one shock absorber assembly affixed between said mounting plate and fixed portion of said enclosure.

11. A dead front fuse mounting assembly as defined in claim 10 further comprising means for engaging said non-conductive door responsive to movement of said mounting plate to said closed position and urging said door to said phase isolating position concomitant with movement of said fuse to said electrically closed position.

12. A dead front fuse mounting assembly as defined in claim 9 wherein said plate has a second electrical contact extending therethrough above said U-shaped handle member so as to engage with an electrical elbow connector such that said handle member cannot be pivoted to move said plate to an open position with said elbow connector engaged in said second contact, said first and second contact completing a circuit path through said fuse.

13. A dead front fuse mounting apparatus for use in combination with a high voltage fuse in a multiphase fuse enclosure, comprising a mounting plate supporting said fuse thereon with in a compartment within said enclosure, said enclosure being partially defined by a transverse wall with said mounting plate being hingedly mounted to said transverse wall and selectively movable about a horizontal axis to an open and a closed position relative to an opening formed in said wall such that said fuse is selectively disconnected and connected to a stationary electrical contact within said enclosure; means resiliently urging said mounting plate toward said closed position; and a non-conducting door member mounted so as to move between a closed and open position relative to said opening responsive to the movement of said mounting plate.

14. Apparatus as defined in claim 13 wherein said urging means comprises at least one shaft-like member pivotally affixed to said mounting plate proximal the hinged mounting thereof and affixed within a spring-like mounting on said enclosure beneath said hinge mounting, such that movement of said mounting plate urges said shaft-like member against said spring-like mounting.

15. Apparatus as defined in claim 14 further comprising means for releasably securing said mounting plate in said open position.

16. Apparatus as defined in claim 13 wherein said non-conducting door is hingedly mounted to said transverse wall so as to rotate about an axis parallel to the plane of said wall and perpendicular to said horizontal axis and further comprising means resiliently urging said non-conducting door toward said closed position.

* * * * *